UNITED STATES PATENT OFFICE 2,452,152

PROCESS OF FORMING POLYVINYL FORMAL COATINGS ON TEXTILES

James Henry Rooney, John Henry Sharphouse, and Philip Richard Hawtin, Spondon, near Derby, England, assignors, by mesne assignments, to Celanese Corporation of America, a corporation of Delaware No Drawing. Application December 31, 1943, Serial No. 516,530. In Great Britain January 25, 1943

7 Claims. (Cl. 117—76)

This invention relates to the production and use of a kind of film-forming substance which is insoluble in water and is resistant to penetration by mustard gas.

There is a demand for materials having the properties referred to, for example in connection with the production of clothing designed to afford protection against mustard gas. Insolubility to cold water is, of course, a property obviously necessary in such protective clothing, and insolubility in boiling water is very desirable since an important method of freeing protective clothing from contamination with mustard gas is to subject the clothing to boiling water or steam. Most water-resistant film-forming materials, however, are permeable to mustard gas and of the few kinds of film-forming material hitherto known to be resistant both to water and to mustard gas, all present some serious disadvantage, e. g. difficulty in working, lack of flexibility and/or insufficient chemical stability. In consequence of the exacting requirements which gas-protective clothing must satisfy the only materials which have hitherto been used for this purpose have had a basis either of rubber or of a drying oil. Neither kind of material is wholly satisfactory. Drying oil coatings deteriorate rapidly under certain conditions of storage and use, and rubber has an undesirably low resistance to penetration by mustard gas. It is, moreover, in short supply.

We have now found that substances which are insoluble in water and in most substantially neutral organic liquids, including mustard gas, as well as resistant to penetration by the vapours of such liquids, and capable of forming flexible films and coatings, can be obtained by incomplete acetalisation of a multi-hydroxy linear polymer of high molecular weight which is itself capable of forming flexible films. According, therefore, to the present invention films (including coatings) of the multi-hydroxy polymer are subjected to acetalisation which is allowed to proceed up to, but not substantially beyond, the stage at which insolubility of the film in boiling water is reached. Thus, for example, a film-forming substance having the properties desired can be made by acting upon polyvinyl alcohol, preferably in the form of a film or coating, with formaldehyde in such a way that about 20–30%, and preferably about 20–25%, of hydroxyl, on the weight of the dry material, i. e. about 55–80% and preferably 56–68%, of the original hydroxyl content is retained. The acetalisation is preferably carried out under such conditions that the polyvinyl alcohol or other multi-hydroxy polymer does not dissolve at any stage in the process. Since the best results have so far been obtained by acetalising polyvinyl alcohol with formaldehyde, the invention will be described with particular reference to the production of insoluble substances by reaction of those substances.

As indicated above, the insoluble films and coatings of the invention are preferably obtained by acetalisation of preformed films and coatings of the polyvinyl alcohol. Suitable films of polyvinyl alcohol can be formed by casting an aqueous solution of the alcohol on to a suitable surface, evaporating water, and stripping the film from the surface. When thin films or foils are required, for example from 0.005" or less up to about 0.01", the casting surface may conveniently be that of a metal drum or that of an endless metal band such as is used in casting thin films and foils of cellulose acetate, the layer of film-forming solution being dried by passage through a warm dry atmosphere in the course of rotation of the drum or travel of the belt. Thick films can be cast on apparatus of this kind, but it is generally preferable, since such films require a longer drying period and are less flexible, to cast them on to a smooth flat surface of a rigid support, for example the surface of a polished glass or metal plate. Aqueous solutions of a polyvinyl alcohol produced by careful saponification of a polyvinyl acetate of which an 8.5% solution by weight in benzene has a viscosity of about 7 to 8 centipoises, containing about 30 kilograms of the alcohol per 100 litres of solution, have been found very suitable for forming the films of the invention. The concentration may be varied somewhat according to the degree of polymerisation of the alcohol, higher concentrations being used with polyvinyl alcohols of lower molecular weight as indicated by viscosity measurements.

The acetalisation may be effected by subjecting the polyvinyl alcohol films to formaldehyde in an aqueous bath containing a catalyst for the condensation and of such composition that the polyvinyl alcohol remains insoluble in the bath throughout. To prevent the polyvinyl alcohol going into solution the bath may contain a substantial proportion of a water-soluble liquid which is a non-solvent for the alcohol. Among such liquids are acetone, dioxane and methylene ethylene ether. It is possible to carry out the acetalisation without solution in baths in which the acetone content is between about 100% (excluding the formaldehyde and catalyst from consideration) to about 50% by volume. It is found, however, that in substantially anhydrous baths a product of lower flexibility is produced and it is preferred to work with a bath in which the ratio of acetone ranges from about 2:1 to about 3:1 by volume. Excellent results have been obtained in baths containing about 25 parts of water to 65 of acetone.

With regard to the catalyst, the best results have been obtained using hydrochloric acid in the proportion of about 0.5 to about 1.5% of the weight of the bath. Other acid catalysts can, however, be employed, for example sulphuric acid, phosphoric acid, sulphur dioxide and even nitric acid. The acetalisation is preferably carried out at temperatures not substantially above atmospheric, and to render acetalisation at such temperatures possible, it is desirable to use an active catalyst such as those referred to above, rather than a substance which develops catalytic activity at high temperatures only, for example ammonium chloride or other salt of a strong acid with a volatile organic base.

The amount of formaldehyde present in the bath as determined according to the proportion of free hydroxyl which it is desired to retain in the product and, as indicated above, this in the case of polyvinyl formal is preferably between 20 and 25% on the weight of the dry product. A suitable concentration of formaldehyde with which to work is about 2-3% by weight. The acetalisation may be carried out by immersing the film in the bath containing water, acetone and formaldehyde, until equilibrium has been reached, adding the acid catalyst and leaving the film immersed in the bath until the formaldehyde has been substantially exhausted. The film is then removed and washed in a mildly alkaline bath to neutralise acidity. A suitable washing solution may be formed from 10 parts of an ammonium hydroxide solution of specific gravity 0.880 and 90 to 100 parts of a mixture of acetone and water in equal proportions by volume.

Films produced as described above when in equilibrium with air of moderate humidity, for example 46% relative humidity, or with air of higher humidity up to the saturation point, are of very good flexibility. Their flexibility diminishes somewhat, however, as the moisture content is reduced and is substantially less when the films are dehydrated completely. With a view to the retention by the films of high flexibility even when exposed to drying conditions, they may be given various after-treatments. They may, for example be coated with an inert hygroscopic organic liquid such as glycerol or other polyhydroxy alcohol, or with an inert inorganic hygroscopic substance such as calcium chloride. Such hygroscopic substances however, are removed by washing. A treatment which is of good resistance to washing and which is of considerable advantage in enabling the film to retain high flexibility when exposed to drying conditions, is to form on the surface of the film, while its moisture content is relatively high, an insoluble soap. Very good results have been obtained by forming calcium soaps on the material, for instance by subjecting it successively to treatment in an aqueous soap solution and in an aqueous solution of calcium chloride. The aqueous soap solution may, for instance be a solution of sodium oleate, sodium stearate, sodium palmitate or an alkali metal salt of other soap-forming acid in about 10% concentration. The best results have been obtained using sodium oleate as the soap. After formation of the soap on the surface of the film, the film may be washed in acetone, dried, washed in water and finally allowed to dry in the open air.

Coatings having a basis of the insoluble substances of the invention may be produced by methods similar to that described above for the production of films. Thus, for example a textile fabric may be impregnated with an aqueous solution of polyvinyl alcohol either by spreading methods (which are to be preferred, since they enable solutions of higher viscosity to be used) or by a bath treatment, or a preformed film of polyvinyl alcohol may be bonded to a textile fabric under pressure, preferably in the presence of an inert water-soluble substance having lubricating properties, such as glycerine or glycol. Acetalisation and after-treatment of the coated material may then be carried out as described above in connection with the production of films. Porous materials other than fabrics may be provided with insoluble coatings by the methods of the invention. Thus, for example surfaces of wood, leather, paper, fibre-board, asbestos and similar materials may be provided with coatings of polyvinyl alcohol which may be acetalised in situ and, if desired, provided with a coating of insoluble soap or subjected to other treatments designed to conserve the moisture content of the coating.

The following examples illustrate the invention:

*Example I*

A film of polyvinyl alcohol about 0.008" thick is formed by flowing on to a film-casting surface an approximately 15% aqueous solution of polyvinyl alcohol and evaporating the water. The polyvinyl alcohol employed is obtained by careful saponification of a polyvinyl acetate the viscosity of which in 8.5% (by weight) solution in benzene is 7 to 8 centipoises. The film is stripped from the casting surface and treated at 20 to 25° C. in a bath of the following composition, the parts being by volume.

| | Parts |
|---|---|
| 32% (by weight) aqueous hydrochloric acid | 5 |
| 40% (by weight) aqueous formaldehyde | 5 |
| Water | 25 |
| Acetone | 65 | until the hydroxyl content of the dry film has been reduced to about 20%. Under the conditions specified this will require a treatment of 2 to 3 hours by which time it will be found that the film is no longer soluble in boiling water. The film is then removed and immersed in succession in the following baths for the times stated.

(a) 20 minutes in a bath of the following composition by volume:

| | Parts |
|---|---|
| Aqueous ammonium hydroxide of specific gravity 0.880 | 10 |
| Acetone | 45 |
| Water | 45 |

(b) 30 minutes in a 10% (by weight) aqueous solution of sodium oleate at about 45° C.

(c) 15 minutes in a 10% (by weight) aqueous solution of calcium chloride at 20 to 25° C.

The film is then rinsed with acetone to remove any loose adherent calcium soap and dried at 20 to 25° C. The film obtained in this way is soft and pliable, it can be treated with water even at the boiling point thereof without damage, and is resistant to penetration by mustard gas. It also exhibits considerable resistance to penetration by other organic liquids or their vapours, e. g. to benzene and ethylene dichloride.

Example II

The process is carried out as in Example I, except that after stripping the film of polyvinyl alcohol from the casting surface it is united under pressure at about 100° C. to one side of a Nainbetter cotton fabric which contains its own weight of a 50% by volume aqueous solution of glycerine. The coated fabric is then subjected to the acetalisation treatment of Example I followed by the various after-treatments of that example. In this way a soft pliable fabric suitable for use in the production of gas-resistant clothing is obtained.

Example III

An approximately 30% solution (by weight) of a polyvinyl alcohol produced as described above is spread at about 100° C. on a Nainbetter cotton fabric. The fabric is dried and then treated in the same way as the coated fabric in Example II. Owing to the high viscosity of the solution of polyvinyl alcohol employed the coating will be found not to extend throughout the thickness of the fabric, with a consequent gain in flexibility.

Example IIII

The process is carried out as in Example III except that a 25% aqueous solution of the polyvinyl alcohol is employed and a loosely-woven cotton fabric is employed instead of the Nainbetter. In this case the coating will permeate the entire thickness of the fabric.

As indicated above, one of the most important applications of the products of the invention is in affording protection against liquids such as mustard gas having an irritant or toxic action when brought into contact with the skin. Protective clothing against such gases may be made from the fabrics of the invention. The films of the invention are more suitable for the production of such items of equipment as eye shields than for the production of garments. Apart from clothing intended to afford protection against war gases, the materials of the invention, and particularly impregnated fabrics, are of use in the production of gloves and other articles of apparel designed to give protection against liquids encountered in industry which produce toxic or irritant effects by contact with the skin. Most fat soluble liquids are in this class. The fabrics and films of the invention can be used as packaging material, for instance, for protecting food against contamination with mustard gas or the like. Containers and piping for substantially neutral organic liquids whether of the hydrophobe or hydrophile kinds can be made of, or lined with, films or coatings produced according to the invention.

The invention has been described with particular reference to the use of polyvinyl alcohol as the multi-hydroxy polymer and formaldehyde as the aldehyde employed in acetalisation. Products of similar constitution to the formaldehyde acetals of polyvinyl alcohol described above are obtainable, however, using other aldehydes, for example acetaldehyde, benzaldehyde, acrolein or furfural. These aldehydes may be employed under such conditions that the acetal formed retains the same proportion (about 55–80% and preferably 56–68%) of the hydroxyl groups originally present, as when formaldehyde is used.

Instead of polyvinyl alcohol other multi-hydroxy polymers capable of forming flexible films, can be used, for example polymerised methyl vinyl alcohol and the products obtained by reduction of linear polymers containing recurrent aldehyde or ketone groups, for example polymerised methyl vinyl ketone and polymerised acrolein, can be used. Other multi-hydroxy polymers which may be subjected to partial acetalisation are incompletely saponified vinyl esters, e. g., the acetate propionate and butyrate, and alkyl vinyl esters, and incompletely reduced polymers containing recurrent aldehyde or ketone groups such as those referred to immediately above. In general however any substantial proportion of alkyl, ester, aldehyde or ketone groups results in a compound which is soluble in or swollen by some organic liquids. Carbohydrates of high molecular weight such as cellulose, the starches and gums, are also capable of forming insoluble compounds by incomplete acetalisation, but in general these compounds are insufficiently stable and lacking in the desired mechanical properties for the production of flexible films.

The term "films" as used in the following claims includes both supported and unsupported films.

Having described our invention, what we desire to secure by Letters Patent is:

1. Process for the production of a textile fabric which is resistant to penetration by mustard gas and by water, which comprises providing a single layer of a fabric of regenerated cellulose of high tenacity with an adherent film of polyvinyl alcohol, and treating the film with a dilute solution of formaldehyde and an inorganic acid as catalyst in a non-solvent composition for polyvinyl alcohols and polyvinyl formals consisting of a mixture of water and a water-miscible organic liquid selected from the group which consists of acetone, dioxane and methylene-ethylene ether, the amount of formaldehyde being such that 20–45% of the hydroxyl groups in the polyvinyl alcohol are acetalized.

2. Process for the production of a textile fabric which is resistant to penetration by mustard gas and by water, which comprises providing a single layer of a fabric with an adherent film of polyvinyl alcohol and then treating the film with a dilute solution of formaldehyde and an inorganic acid as catalyst in a non-solvent composition for polyvinyl alcohols and polyvinyl formals consisting of a mixture of water and a water-miscible organic liquid selected from the group which consists of acetone, dioxane and methylene-ethylene ether, the amount of formaldehyde being such that 20–45% of the hydroxyl groups in the polyvinyl alcohol are acetalized.

3. Process for the production of a textile fabric which is resistant to penetration by mustard gas and by water, which comprises spreading an aqueous solution of polyvinyl alcohol on a single layer cellulose fabric, removing water by evaporation whereby an adherent film of polyvinyl alcohol is formed on the fabric and treating the film with a dilute solution of formaldehyde and an inorganic acid as catalyst in aqueous acetone containing 2 to 3 volumes of acetone for each volume of water, the amount of formaldehyde used being such that 20–45% of the hydroxyl groups in the polyvinyl alcohol are acetalized.

4. Process for the production of a textile fabric which is resistant to penetration by mustard gas and by water, which comprises providing a single layer of a fabric with an adherent film of polyvinyl alcohol and then treating the film with a dilute solution of formaldehyde and an inorganic acid as catalyst in a non-solvent composition for polyvinyl alcohols and polyvinyl formals consisting of a mixture of water and a water-miscible organic liquid selected from the group which consists of acetone, dioxane and methylene-ethylene ether, the amount of formaldehyde being such that 20–45% of the hydroxyl groups in the polyvinyl alcohol are acetalized and, while its moisture content is high, providing on both sides of the compound material so produced a coating consisting of a water-insoluble soap.

5. Process for the production of a textile fabric which is resistant to penetration by mustard gas and by water, which comprises providing a single layer of a fabric with an adherent film of polyvinyl alcohol and then treating the film with a dilute solution of formaldehyde and an inorganic acid as catalyst in a non-solvent composition for polyvinyl alcohols and polyvinyl formals consisting of a mixture of water and a water-miscible organic liquid selected from the group which consists of acetone, dioxane and methylene-ethylene ether, the amount of formaldehyde being such that 20–45% of the hydroxyl groups in the polyvinyl alcohol are acetalized and, while its moisture content is high, providing on both sides of the compound material so produced a coating consisting of a calcium soap.

6. Process for the production of a textile fabric which is resistant to penetration by mustard gas and by water, which comprises spreading an aqueous solution of polyvinyl alcohol on a single-layer cellulose fabric, removing water by evaporation whereby an adherent film of polyvinyl alcohol is formed on the fabric, treating the film with a dilute solution of formaldehyde and an inorganic acid as catalyst in aqueous acetone containing 2 to 3 volumes of acetone for each volume of water, the amount of formaldehyde used being such that 20%–45% of the hyroxyl groups in the polyvinyl alcohol are acetalized, and, while its moisture content is high, providing on both sides of the material so produced a coating consisting of a water-insoluble soap.

7. Process for the production of a textile fabric which is resistant to penetration by mustard gas and by water, which comprises spreading an aqueous solution of polyvinyl alcohol in a single-layer cellulose fabric, removing water by evaporation whereby an adherent film of polyvinyl alcohol is formed on the fabric, treating the film with a dilute solution of formaldehyde and an inorganic acid as catalyst in aqueous acetone containing 2 to 3 volumes of acetone for each volume of water, the amount of formaldehyde used being such that 20%–45% of the hydroxyl groups in the polyvinyl alcohol are acetalized, and, while its moisture content is high, providing on both sides of the material so produced a coating consisting of a calcium soap.

JAMES HENRY ROONEY.
JOHN HENRY SHARPHOUSE.
PHILIP RICHARD HAWTIN.

REFERENCES CITED

The following references are of record in the file of this patent:

UNITED STATES PATENTS

| Number | Name | Date |
|---|---|---|
| 1,963,975 | Ellis | June 26, 1934 |
| 2,036,036 | Gibbons | Mar. 31, 1936 |
| 2,083,628 | Zeiger | June 15, 1937 |
| 2,173,781 | Gibello | Sept. 19, 1939 |
| 2,332,895 | D'Alelio | Oct. 26, 1943 |
| 2,360,477 | Dahle | Oct. 17, 1944 |
| 2,370,126 | Dahle | Feb. 27, 1945 |
| 2,387,833 | Dahle | Oct. 30, 1945 |
| 2,407,061 | Dahle | Sept. 3, 1946 |

FOREIGN PATENTS

| Number | Country | Date |
|---|---|---|
| 430,136 | Great Britain | June 13, 1935 |
| 496,734 | Great Britain | Dec. 5, 1938 |

OTHER REFERENCES

India-Rubber Journal, Mar. 20, 1943, page 264.
Wartime Guide to Monsanto Plastics, 1943, page 3.